(12) United States Patent
Tippy

(10) Patent No.: US 8,239,101 B2
(45) Date of Patent: Aug. 7, 2012

(54) VEHICULAR SAFETY SYSTEMS STATUS DISPLAY

(75) Inventor: David J. Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 516 days.

(21) Appl. No.: 12/492,173

(22) Filed: Jun. 26, 2009

(65) Prior Publication Data

US 2010/0332069 A1    Dec. 30, 2010

(51) Int. Cl.
*G06F 19/00* (2011.01)
*G06F 17/00* (2006.01)

(52) U.S. Cl. ......... 701/45; 701/104; 701/32.2; 180/268; 180/284; 280/735

(58) Field of Classification Search ............... 701/29, 701/104, 45; 180/268, 284; 280/735
See application file for complete search history.

(56) References Cited

U.S. PATENT DOCUMENTS

| | | | | |
|---|---|---|---|---|
| 6,223,714 B1 * | 5/2001 | Anderson et al. | ......... | 123/198 D |
| 6,640,174 B2 * | 10/2003 | Schondorf et al. | ............ | 701/45 |
| 6,731,023 B2 * | 5/2004 | Rothleitner et al. | ............ | 307/64 |
| 6,733,036 B2 * | 5/2004 | Breed et al. | .................... | 280/735 |
| 6,766,235 B2 * | 7/2004 | Frimberger et al. | ............ | 701/45 |
| 6,856,873 B2 * | 2/2005 | Breed et al. | ..................... | 701/45 |
| 7,055,640 B2 * | 6/2006 | Cook | ............................ | 180/284 |
| 7,164,117 B2 * | 1/2007 | Breed et al. | .................... | 250/221 |
| 7,320,478 B2 * | 1/2008 | Gaboury et al. | ............... | 280/735 |
| 7,407,028 B2 * | 8/2008 | Tanaka | ........................... | 180/268 |
| 7,575,248 B2 * | 8/2009 | Breed | ........................... | 280/735 |
| 2004/0036261 A1 * | 2/2004 | Breed | ........................... | 280/735 |
| 2006/0082110 A1 * | 4/2006 | Gaboury et al. | ............... | 280/735 |
| 2006/0208169 A1 * | 9/2006 | Breed et al. | .................... | 250/221 |
| 2007/0005202 A1 * | 1/2007 | Breed | ............................. | 701/29 |
| 2007/0156312 A1 * | 7/2007 | Breed et al. | ..................... | 701/29 |
| 2008/0042410 A1 * | 2/2008 | Breed et al. | .................... | 280/735 |
| 2008/0161989 A1 * | 7/2008 | Breed | ............................. | 701/29 |
| 2010/0332069 A1 * | 12/2010 | Tippy | ............................. | 701/29 |

* cited by examiner

*Primary Examiner* — Thomas Black
*Assistant Examiner* — Wae Louie
(74) *Attorney, Agent, or Firm* — Frank A. MacKenzie; MacMillan, Sobanski & Todd, LLC

(57) ABSTRACT

Apparatus for a road vehicle has a plurality of deployable devices, each performing a crash safety function. A device controller controls deployment of a respective deployable device and that provides respective status messages according to a deployment status of the respective deployable device. Respective status messages for each deployable device include a ready message and a deployed message. A crash sensor detects a crash event when the vehicle is involved in an impact, wherein the crash sensor generates a crash event message. A display controller is coupled to the deployable devices to receive the status messages and coupled to the crash sensor to receive the crash event message. A display is coupled to the display controller for displaying status information to a driver of the vehicle. The displayed status information includes pre-crash status of the deployable devices and post-crash status of the deployable devices.

12 Claims, 2 Drawing Sheets

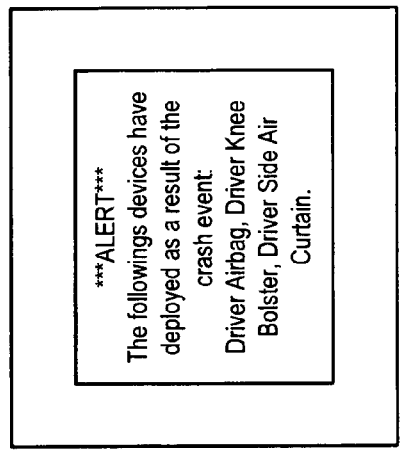
Fig. 3
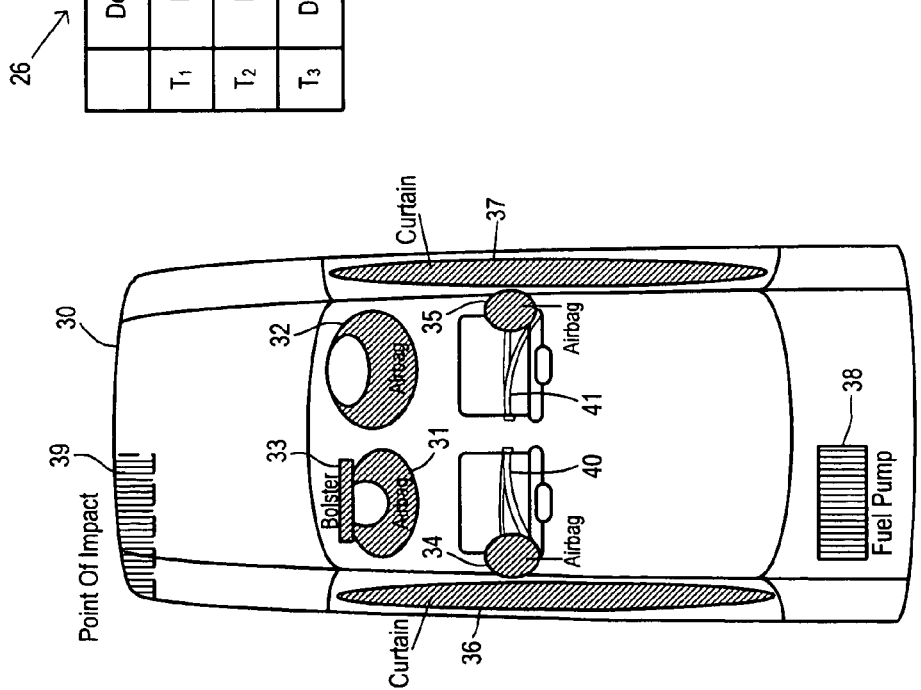
Fig. 4
Fig. 2

VEHICULAR SAFETY SYSTEMS STATUS DISPLAY

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to passenger safety systems in road vehicles, and, more specifically, to a system for informing a driver of pre-crash and post-crash status of deployable devices in the safety system.

Since the first introduction of airbag supplemental restraint systems, the safety capability of motor vehicles has increased dramatically. Restraint systems have become highly adaptive, and the possible combinations of devices that may be deployed during a crash event are many. Examples of deployable devices that may be installed on a particular vehicle include driver and passenger front airbags, knee bolsters, side airbags, side curtain airbags, pre-tensioning belt systems, and fuel delivery systems. In view of the potential variety of devices, the vehicle driver or occupants may not be fully aware of the various safety devices that are present in the vehicle.

Deployable devices in a vehicle typically all communicate with or are directly controlled by a restraints control module in the vehicle. The restraints control module maintains status information indicative of any faults that may have occurred in any particular deployable device. The restraints control module can provide status messages over a vehicle communication bus to other electronic modules in the vehicle. Other deployable devices not controlled by the restraints control module may be integrated with a separate controller that is likewise connected to the vehicle communication bus to exchange status messages (e.g., with the restraints control module or with other systems). Due to the critical nature of restraints systems, the control modules perform diagnostic checks of the respective deployable devices. When a fault is detected, an appropriate status message is sent so that an indicator can be activated in order to alert the driver of a fault in the restraints system. However, identification of the faulted system is not usually specified in the driver notification, so that the driver may not be able to determine potential mitigating actions when using the vehicle prior to taking the vehicle to a repair facility (e.g., the driver would not know to relocate a passenger from a front passenger seat to a rear driver-side seat when a passenger side curtain airbag is faulted unless notified of the specific fault).

Due to the nature of some deployable devices, when a crash event occurs and deployable devices have deployed, it may be difficult for the driver or occupants to identify all of the deployable devices that have in fact been deployed. For example, the fuel delivery system in a vehicle may be a deployable device in the sense that when a crash event is detected then fuel delivery is disabled as a precaution against the spilling of fuel if a fuel line was compromised as a result of the impact. Typically, the engine control unit selectively activates or deactivates the fuel pump according to the manual use of the ignition switch. In response to a crash notification, the engine control unit disables the fuel pump and keeps it disabled until the driver takes specific actions to manually reset the fuel delivery function. For example, fuel delivery may be re-enabled by manually cycling the ignition key two or more times, or by pressing a reset button located in the trunk. Although the manual reset procedure is described in the owner manual for the vehicle, a driver may be unaware of or have forgotten such procedure in the minutes immediately following an impact event. Consequently, they may be unable to restart the vehicle when desired. U.S. Pat. No. 7,055,640 to Cook discloses a fuel cut-off control system for a vehicle that provides a cut-off notification signal to indicate a fuel cut-off event to the driver. However, there is no disclosure of any automatic system for generating guidance information to assist the driver in the reset procedure itself.

SUMMARY OF THE INVENTION

The present invention provides both pre-crash status of the deployable devices and post-crash status of the deployable devices which may include information on resetting a device, wherein such status is preferably displayed using a graphic and textual display panel present in the vehicle in connection with another system, such as a vehicle navigation system. Advantages include 1) informing the driver of the safety features present in the vehicle and of their actual readiness to respond in the event of a crash, 2) informing the driver which actions were taken in response to a crash event, thereby increasing the driver's confidence in the robustness of the safety systems overall, 3) providing a repository for valuable information for accident reconstruction, and 4) the ability to interface with other vehicular systems for providing automatic notification and details of crash events to remotely located emergency services.

In one aspect of the invention, apparatus for a road vehicle comprises a plurality of deployable devices, each performing a crash safety function. At least one device controller controls deployment of a respective deployable device and provides respective status messages according to a deployment status of the respective deployable device. Respective status messages for each deployable device include a ready message and a deployed message. A crash sensor detects a crash event when the vehicle is involved in an impact, wherein the crash sensor generates a crash event message. A controller is coupled to the deployable devices to receive the status messages and coupled to the crash sensor to receive the crash event message. A display is coupled to the controller for displaying status information to a driver of the vehicle. The displayed status information includes pre-crash status of the deployable devices and post-crash status of the deployable devices.

BRIEF DESCRIPTION OF THE DRAWINGS

FIG. 2 is a sample display according to one embodiment of the present invention.

FIG. 3 is a table showing system status values as stored in a state memory at various times.

FIG. 4 is another sample display including a post-crash textual message.

DETAILED DESCRIPTION OF PREFERRED EMBODIMENTS

Figure 1:
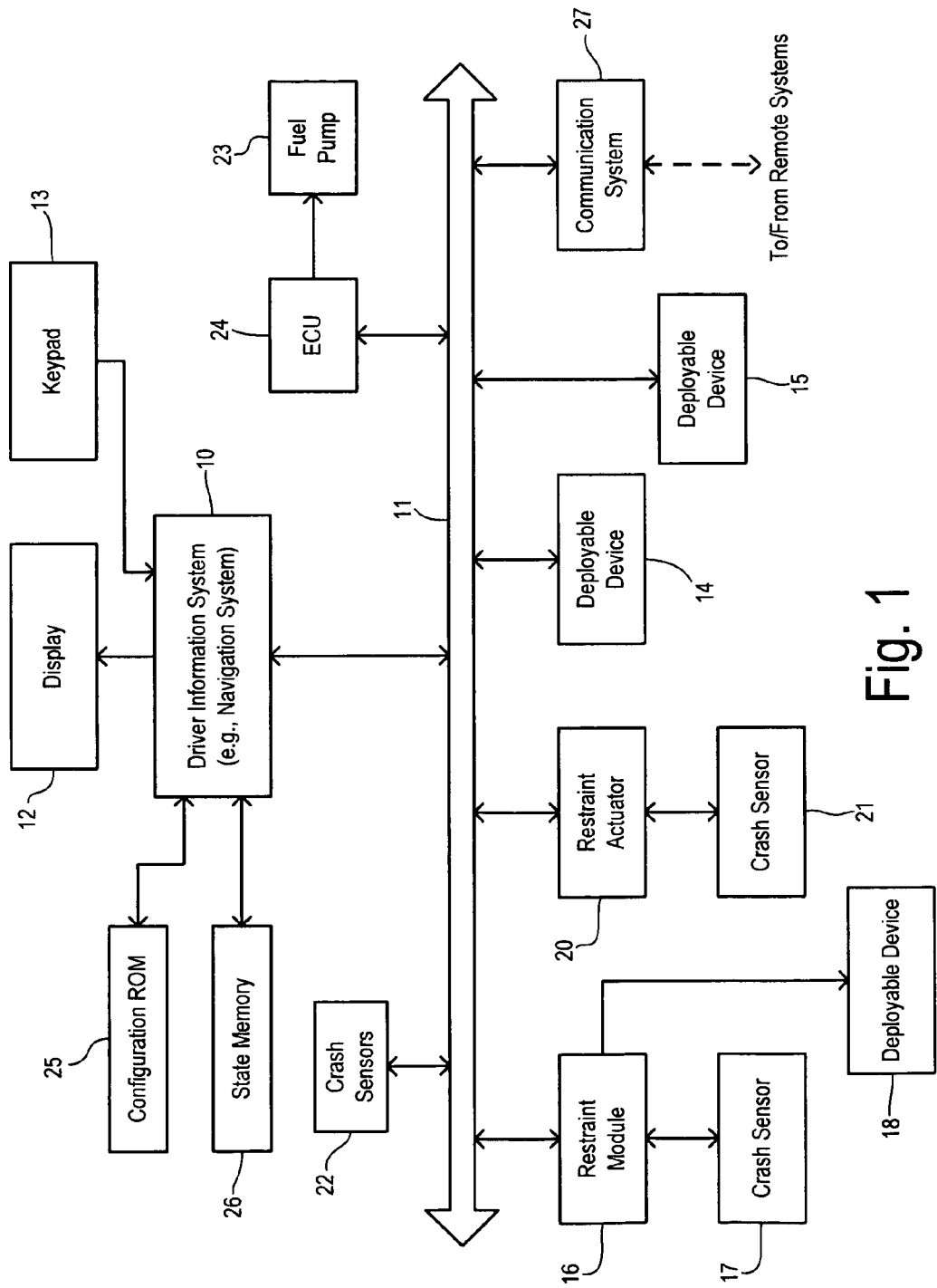
FIG. 1 is a block diagram showing a vehicular electronics system according to one embodiment of the present invention.

The present invention employs an in-vehicle graphics display, such as a navigation screen for a vehicle navigation system (e.g., the Sync System available from Ford Motor Company), to convey information about deployable safety devices both prior to and following any crash events. A pictorial, overhead view of the vehicle with readiness icons representing the various deployable features can be used to inform the driver about the safety devices within their vehicle. After a crash event, the display may then indicate which devices have been deployed and any reset actions that can be taken to restore a deployed device to full readiness.

A first preferred embodiment of a vehicle safety system is shown in FIG. 1. An electronic control module for a driver information system 10 (such as a navigation system) is coupled to a vehicle multiplex communication bus 11 (such as a CAN bus). A display screen 12 coupled to driver information system control module 10 may comprise an LCD display, for example. A keypad 13 is connected to module 10 for entry of manual commands to facilitate user interaction with the pre-crash and post-crash status information on display 12. The deployable devices of the present invention may include self-contained deployable devices 14 and 15 that communicate with module 10 over bus 11. Deployable devices 14 or 15 may make a deployment decision on their own or may be coupled over bus 11 to a restraint module 16 which is further connected to a crash sensor 17 for informing deployable devices 14 and 15 when to activate. A deployable device 18 is directly connected to restraint module 16 and is deployed by a drive signal generated in restraint module 16.

The deployable devices in a vehicle may further include an individual restraint actuator 20 connected to bus 11 and to a standalone crash sensor 21. Alternatively, crash sensors 22 may be separately connected to bus 11 for informing restraint actuator 20 or the controllers within other deployable devices when a deployment should occur. Typically, the crash sensors are individually adapted to sensing different types or locations of crash events and are used to determine the characteristics of a specific crash event so that only the appropriate deployable devices are activated.

Bus 11 is used to transmit various status messages between restraint module 16 and controller 10 (or between individual controllers for any deployable device including such a controller and controller 10). The status messages include a ready message and a deployed message according to the current status of the respective device. In addition, a fault message can be transmitted over bus 11 when a respective controller for a deployable device detects a fault condition. Bus 11 may also carry crash event messages generated by respective crash sensors or by restraint module 16 or another control module connected to a particular crash sensor, whenever an actual crash event occurs.

The deployable devices may further include a fuel pump 23 connected to an engine control unit (ECU) 24 communicatively coupled to bus 11. In one typical scenario of the invention, a crash event may be detected by restraint module 16 which sends a crash event message over bus 11 to ECU 24 causing it to deactivate fuel pump 23, thereby avoiding the pumping of fuel when there is potential for a fuel system leak. ECU 24 may be coupled to other devices, such as an ignition switch (not shown) that may be used to reset the disabled fuel pump as known in the art.

Driver information system control module 10 is coupled to a configuration ROM 25 which may be written with configuration data during or prior to vehicle manufacture to identify the individual components within the safety system, specifically identifying the device controllers (e.g., restraint controller), deployable devices, and crash sensors of a particular vehicle. Module 10 may further include a state memory 26 for storing (i.e., archiving) status information of the deployable devices at various times during operation of a vehicle (e.g., for accident reconstruction).

The vehicle may further include a communication system 27 for communicating wirelessly with remote systems (not shown) for purposes of emergency notification, for example.

FIG. 2 shows an example of a pictorial, overhead display for presenting status information to a driver of the vehicle, wherein the displayed status information includes pre-crash status of deployable devices and post-crash status of the deployable devices. A graphic FIG. 30 representing the vehicle in an overhead view is displayed showing a general layout including icons representing deployable devices such as front airbags 31 and 32, and a front driver knee bolster 33. The deployable devices also include side airbags 34 and 35, side airbag curtains 36 and 37, and a fuel pump 38. Pretensioning belt systems 40 and 41 may also be shown when under control of the central restraint system. When showing a pre-crash status of deployable devices, "readiness icons" representing various deployable devices that have given a "ready message" are shown in green (e.g., as indicated for icons 31-37 in FIG. 2), while other "not-ready icons" corresponding to deployable devices for which a faulted message has been sent (or for which a readiness message has not otherwise been sent) are shown in red. In the hypothetical situation shown in FIG. 2, fuel pump 38 is shown in red, indicating that it is currently deactivated.

Following a crash event, status information on the display for the post-crash status of the deployable devices includes icons corresponding to undeployed devices shown in green, while icons corresponding to a deployed device may again be shown in red or by some other unique color, if desired. The post-crash status may further include a display of the point of impact by a colored icon 39 as shown at the front driver side corner of the vehicle, as determined in response to detection by the crash sensors of such point of impact.

Exemplary contents of the state memory are shown in FIG. 3 wherein different respective system states have been collected at separate times $T_1$, $T_2$, and $T_3$ during operation of the vehicle (e.g., before and after a crash event). The state memory includes status information for selected deployable devices of interest including a device #1, device #2, and the fuel delivery system. Each state may also include a field for storing crash sensor data (i.e., the identity of a crash sensor detecting a crash), and a crash data field for identifying a determined point of impact based on all the crash sensor data.

At time $T_1$, devices #1, and #2 were reported ready by respective ready messages. Based on multiplex bus messages from the ECU, the fuel delivery system status was On. At time $T_1$, the displayed status information for the pre-crash status would include a green colored readiness icon for the fuel pump. Since no crash event has yet occurred, there is no data for either an activated sensor or any details of a crash determination. At time $T_2$, device #2 indicates a fault by sending a fault message to the information system controller. At time $T_2$, a not-ready icon corresponding to device #2 would be colored red since the corresponding device would not be ready to deploy. At time $T_3$, a crash event message was generated in response to a crash sensor and was sent to the driver information system controller so that the controller generates a post-crash status display while storing corresponding device statuses in the state memory. In the example for time $T_3$, devices #1 and #2 have deployed and the fuel delivery system has also deployed (i.e., been shut off). The state memory notes that the front sensor was activated and that the crash data determination (e.g., made by the information controller or a restraint system controller) indicates a left front impact.

Whenever the fuel delivery system has been deployed (i.e., deactivated), an alert message as shown in FIG. 4 is displayed as part of the post-crash status on the status information display. In addition to informing the driver of the particular devices that have been deployed, the display can further include textual instructions for reactivating the fuel delivery system as follows:

\*\*\*ALERT\*\*\*

As a precaution, your vehicle's fuel delivery has been disabled as a result of a crash event. Fuel delivery may be re-enabled by taking the following steps:
1. \*\*\*Inspect the vehicle for possible fuel leaks\*\*\*
2. In the case of a push button start, push the button twice.
3. In the case of a key start, turn the key to OFF, then turn the key to ON.

Note: In some cases it may take more than one attempt to restart the vehicle.

What is claimed is:

1. Apparatus for a road vehicle, comprising:
a plurality of deployable devices, each performing a crash safety function, wherein the deployable devices include a plurality of inflatable airbags;
at least one device controller that controls deployment of a respective deployable device and that provides respective status messages according to a deployment status of the respective deployable device, wherein respective status messages for a deployable device include a ready message and a deployed message;
a crash sensor detecting a crash event when the vehicle is involved in an impact, wherein the crash sensor generates a crash event message;
a display controller coupled to the device controller to receive the status messages, wherein the display controller further receives the crash event message; and
a display coupled to the display controller for displaying status information to a driver of the vehicle, wherein the displayed status information includes pre-crash status of the deployable devices and post-crash status of the deployable devices, wherein the post-crash status is displayed on the display in response to the display controller receiving the crash event message, wherein the display controller checks whether a deployed message was received for each inflatable airbag, and wherein the display controller generates a deployed icon for each inflatable airbag for which a respective deployed message was received.

2. The apparatus of claim 1 wherein the pre-crash status displayed on the display includes a plurality of icons, wherein the display controller checks whether a ready message was received for each deployable device, and wherein the display controller generates a readiness icon for each deployable device having a respective ready message.

3. The apparatus of claim 2 wherein a readiness icon on the pre-crash status display corresponding to an inflatable airbag for which a respective ready message has been received is colored in green to indicate readiness.

4. The apparatus of claim 2 wherein a not-ready icon is colored in red to indicate lack of readiness on the pre-crash status display corresponding to each inflatable airbag for which a respective ready message was not received.

5. The apparatus of claim 1 wherein the pre-crash status displayed on the display includes a plurality of icons, wherein the controller checks whether a ready message was received for each deployable device, and wherein the display controller generates a not-ready icon for each deployable device for which a respective ready message was not received.

6. The apparatus of claim 1 wherein the display controller checks whether a deployed message was received for each deployable device, and wherein the display controller generates a deployed icon for each deployable device for which a respective deployed message was received.

7. The apparatus of claim 1 wherein the deployable devices include a deployable device with a driver resettable feature, wherein the display controller checks whether a deployed message was received for the deployable device with the driver resettable feature, and if the deployed message was received then the display controller generates a text message on the display providing instructions for resetting the driver resettable feature.

8. The apparatus of claim 1 wherein the deployable device with a driver resettable feature is comprised of a fuel pump and wherein the device controller is comprised of an engine control unit for selectively activating the fuel pump.

9. The apparatus of claim 1 wherein the crash sensor is incorporated within a deployable device.

10. The apparatus of claim 1 wherein the status messages further include a fault message and wherein the pre-crash status and post-crash status are displayed with a respective fault icon for each deployable device for which a respective fault message was received.

11. The apparatus of claim 1 wherein the post-crash status includes a display element indicating a location of impact on the vehicle that has been detected by the crash sensor.

12. The apparatus of claim 1 wherein the display controller and display are integrated with a vehicle navigation system.

\* \* \* \* \*